United States Patent
Savoor et al.

(10) Patent No.: US 7,593,833 B2
(45) Date of Patent: Sep. 22, 2009

(54) SYSTEM AND METHOD FOR DETERMINING PERFORMANCE OF NETWORK LINES

(75) Inventors: Raghvendra G. Savoor, Walnut Creek, CA (US); Xidong Wu, Livermore, CA (US); Stuart L. Blackburn, San Ramon, CA (US); Kapil Shrikhande, Berkeley, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 61 days.

(21) Appl. No.: 11/367,204

(22) Filed: Mar. 3, 2006

(65) Prior Publication Data

US 2007/0208537 A1    Sep. 6, 2007

(51) Int. Cl.
*G06F 11/30* (2006.01)
(52) U.S. Cl. .................... 702/186; 379/27.01
(58) Field of Classification Search ........... 702/58, 702/182–183, 185–187, 199; 379/27.01, 379/27.03, 27.04, 27.05, 27.08, 29.09, 29.1; 370/252, 352; 375/224–227
See application file for complete search history.

(56) References Cited

U.S. PATENT DOCUMENTS

| | | | | |
|---|---|---|---|---|
| 4,022,988 A | 5/1977 | Lentz et al. | ............... | 375/213 |
| 4,149,038 A | 4/1979 | Pitroda et al. | ............... | 370/244 |
| 4,604,745 A | 8/1986 | Takasaki et al. | ............. | 714/713 |
| 6,453,016 B1 | 9/2002 | Chea, Jr. | ................ | 379/29.01 |
| 6,549,570 B1 | 4/2003 | Moden et al. | ............... | 375/224 |
| 6,665,271 B1* | 12/2003 | Thomas et al. | ............... | 370/252 |
| 6,842,426 B2* | 1/2005 | Bogardus et al. | ............ | 370/243 |
| 6,885,662 B2 | 4/2005 | Gerszberg et al. | ........... | 370/354 |
| 7,039,554 B2* | 5/2006 | Nguyen et al. | .............. | 702/183 |
| 7,065,426 B2* | 6/2006 | Valentini et al. | ............. | 700/111 |
| 7,076,397 B2* | 7/2006 | Ding et al. | .................. | 702/182 |
| 2003/0179858 A1 | 9/2003 | Bella et al. | .................. | 379/1.03 |
| 2003/0200059 A1* | 10/2003 | Ignatowski et al. | ......... | 702/186 |
| 2004/0133395 A1 | 7/2004 | Ding et al. | | |
| 2005/0083849 A1* | 4/2005 | Rui et al. | ..................... | 370/252 |
| 2005/0135566 A1 | 6/2005 | Schmidt et al. | ............. | 379/1.04 |
| 2005/0216234 A1* | 9/2005 | Glas et al. | ................... | 702/186 |

OTHER PUBLICATIONS

PCT Search Report for International Patent Application No. PCT/US2007/063186, pp. 1-3, mailed Jul. 24, 2008.
PCT Written Report of the International Searching Authority for International Patent Application No. PCT/US2007/063186, pp. 1-6, mailed Jul. 24, 2008.

* cited by examiner

*Primary Examiner*—Eliseo Ramos Feliciano
*Assistant Examiner*—Mary C Baran
(74) *Attorney, Agent, or Firm*—Jackson Walker L.L.P.

(57) ABSTRACT

A method for determining performance of data communication lines in a DSL network is provided. The method includes determining a performance metric for at least one line from a first set of data that included measurements for each of a plurality of parameters related to the at least one line; establishing a benchmark utilizing a second set of measurements that includes at least one additional measurement for the plurality of parameters; and comparing the performance metric with the benchmark to determine the performance of the at least one line.

27 Claims, 7 Drawing Sheets

| Score | Week of 1/2 | Week of 1/9 | Week of 1/16 | Week of 1/23 | Composite | Flag 1 | Flag 2 |
|---|---|---|---|---|---|---|---|
| DSL TN1 | 84 | 85 | 88 | 89 | 86.5 | N | N |
| DSL TN2 | 70 | 70 | 70 | 70 | 70 | N | Y |
| DSL TN3 | 79 | 79 | 79 | 78 | 78.75 | N | N |
| DSL TN4 | 85 | 80 | 87 | 87 | 84.75 | N | N |
| Mean DA Score | 79.5 | 78.5 | 81 | 81 | 80 | N | N |

SYSTEM AND METHOD FOR DETERMINING PERFORMANCE OF NETWORK LINES

BACKGROUND OF THE DISCLOSURE

1. Field of the Disclosure

The present disclosure relates to the field of telecommunications networks.

2. Description of the Related Art

Performance and associated grade of service provided over communications networks, such as Digital Subscriber Line (DSL) networks, can be highly variable, due to a variety of factors including impairments in lines or links used for transmitting content, loop length, crosstalk, extreme weather conditions, etc. Parameters such as bit rate and noise margin are typically measured by scalar diagnosis methods, and technicians often make subjective determination of whether a particular measurement indicates a problem with a line because performance parameters sometimes vary over time and due to varying load on the lines. Scalar trouble diagnosis methods typically look at the current reported performance values and trouble isolation, and trouble restoration is often driven by subjective determinations of the tester.

Subjective determinations can be difficult to audit since different technicians may have different opinions as to whether a problem requires immediate repair. Auditability and transparent traceability of current performance levels and the "expected" performance levels for a single line, group of lines, such as neighborhood, city, state, and the entire network is typically not done and is often uncorrelated to historical or neighborhood benchmarks.

Therefore, a need exists for an improved method and system to determine performance of network lines, trouble shoot lines and manage the overall performance of such lines.

BRIEF DESCRIPTION OF THE DRAWINGS

For detailed understanding of the present disclosure, references should be made to the following detailed description of an exemplary embodiment, taken in conjunction with the accompanying drawings, in which like elements have been given like numerals, wherein.

DETAILED DESCRIPTION OF THE DISCLOSURE

In view of the above, the present disclosure through one or more of its various aspects and/or embodiments is presented to provide one or more advantages, such as those noted below.

The present disclosure provides system, methods and computer programs to determine performance of lines that provide content over networks, such as a Digital Subscriber Line network. In one aspect the disclosure provides a computer-readable medium accessible to a processor for executing instructions contained in a computer program embedded in the computer-readable medium. The computer program includes an instruction to receive a first set of measurements that includes a measurement relating to each of a plurality of parameters relating to at least one communication line; an instruction to determine a metric relating to performance of the at least one line from the first set of measurements; an instruction to determine a benchmark from a second set of measurements that includes at least one additional measurement for each of the plurality of parameters; and an instruction to compare the metric with the benchmark to infer performance of the at least one line.

In one aspect, the second set of measurements further includes measurements for each of the parameters corresponding to multiple distinct time periods and for a group of lines. In another aspect, the computer program further includes an instruction to update the benchmark based on a running average over a selected time period. The performance metric and the benchmark each may be based on a statistical computation. The performance parameters may include one or more of upstream bit rate; downstream bit rate; difference between downstream bit rate and upstream bit rate; maximum attainable bit rate; downstream attenuation; upstream attenuation; difference between downstream attenuation and upstream attenuation; downstream aggregate power; upstream aggregate power; and code violation. Additionally, the group of lines may correspond to one of: lines having substantially same loop length; a neighborhood; lines connected to a common wire center; a city; a state; substantially all of the lines in the network.

In another aspect, the computer program further includes an instruction to send a message relating to the performance of a line based on the comparison of the metric and the benchmark, which message may include indicating a flag. In another aspect, the disclosure provides a method for determining performance of lines of a communications network that includes: receiving a first set of measurements that includes a measurement relating to each of a plurality of parameters for at least one line providing content to a customer device over the network; determining a performance metric from the received measurements for the at least one line; determining a benchmark from a second set of measurements that includes at least one additional measurement for each of the plurality of parameters; and comparing the performance metric with the benchmark to determine performance of the at least one line. The parameters may include one or more of: upstream bit rate; downstream bit rate; difference between downstream bit rate and upstream bit rate; maximum attainable bit rate; downstream attenuation; upstream attenuation; difference between downstream attenuation and upstream attenuation; downstream aggregate power; upstream aggregate power; and code violation.

In another aspect, the disclosure provides a method of inferring performance of lines of a communications network, which includes: determining a first weighted average from a first set of measurements for a plurality of parameters relating to a first group of lines, each line in the first group providing content over the communications network; determining a second weighted average from a second set of measurements that includes measurements for each of the plurality of parameters for a second group of lines, each line in the second group providing content over the communications network; and comparing the first weighted average with the second weighted average to infer a level of performance for the first and second groups of lines.

In yet another aspect, a system for determining performance of lines of a communications network is provided, which includes: a database that stores measurements of a plurality of parameters for a plurality of lines, each line providing content over the communications network; a processor having access to the database and a computer program to execute instructions contained in the computer program, wherein the computer program contains an instruction to determine a metric relating to performance of the at least one line from the first set of measurements; an instruction to determine a benchmark from a second set of measurements that includes at least one additional measurement for each of the plurality of parameters; and an instruction to compare the metric with the benchmark to infer performance of the at least one line.

Figure 1:
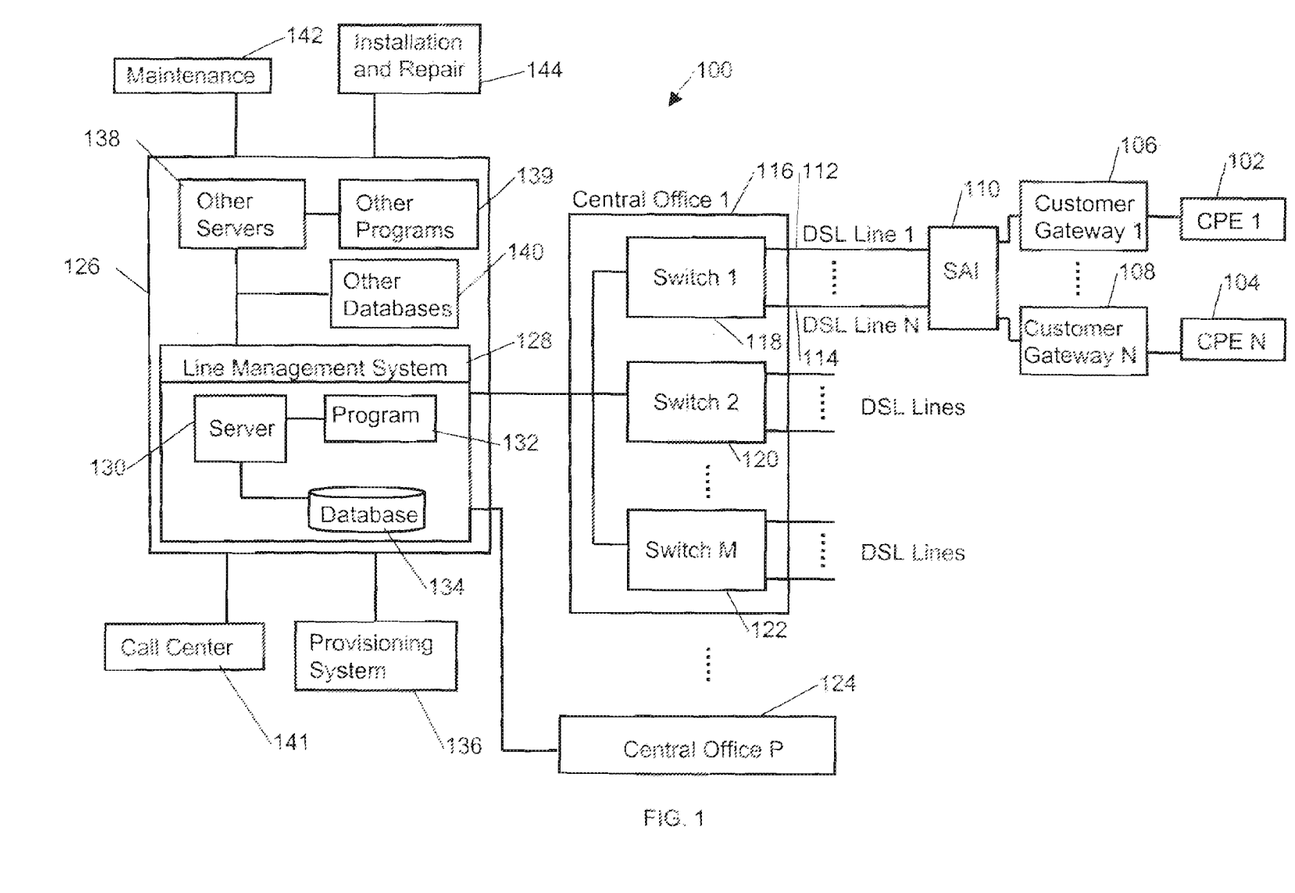
FIG. 1 is a system diagram depicting an exemplary xDSL communications network that includes a line management system, in accordance with one embodiment of the present disclosure.

FIG. 1 is a diagram showing a network 100 that includes a line management system 138 according to one embodiment of the present disclosure. The network shown is a generic Digital Subscriber Line Network (designated as xDSL) and may be any type of network, including ADSL, ADSL 2, SHDSL, VDLS, etc. The network 100 is shown to include a number of central offices such as 116 and 124, designated as Central Offices 1-P, each such central office including a plurality of switches. For example, Central Office 1 is shown to include switches 1-M (118, 120, 122). Central Offices sometimes also are referred to as "Wire Centers." Central Offices typically provide services to a large number of customers in a selected geographical area. Each switch, which may be a Digital Subscriber Line Access Multiplexer, is typically connected, via separate lines which may be a twisted copper pair, optical fiber, etc., to 500-1000 customer premises containing various customer premises equipment (CPE). Thus, a Central Office may serve several thousand customers in neighborhoods of a selected geographical area. Central Offices are in turn coupled to a backbone network that contains servers, databases and transport links that provide content (video, voice and data) to the CPE's via the Central Offices. In one aspect, the line management system and the other servers and databases shown in FIG. 1 are within the backbone and can thus provide line management for any part of the network or the entire network.

Still referring to FIG. 1, switch 1 is shown coupled to Customer Gateway 1 through Customer Gateway N via separate lines designated as DSL Lines 1-N (112, 114). Each customer gateway is further shown connected to a customer premise equipment (such as CPE 1 (102)-CPE N (104)), which may include computers, set-top-boxes connected to television sets, etc. The customer gateway typically may be a DSL modem, accessible to the associated switch. A Service Area Interface (SAI) 110 may be utilized between the switch and multiple neighboring customer gateways. The switch may include processors and other circuitry for two way communications between the switch and the associated customer gateways. The switch also may act as a buffer between a backbone network (not shown) for providing the DSL services to the customers.

In one aspect, the customer gateway includes one or more processors and programs that measure values of certain selected performance parameters of the associated DSL line. The parameters measured may include, but are not limited to, upstream bit rate, downstream bit rate, upstream attenuation (e.g., loss in dB), and downstream attenuation. The measurements may be made according to programmed instructions provided to the customer gateway or on commands sent from the network via the switch. The customer gateway may store the measured data in a storage medium associated with the customer gateway, such as Read-Only Memory (ROM), Random Access Memory (RAM), flash memory, etc. The term "upstream" means looking from or information transfer from the customer gateway end to the network, while the term "downstream" means looking from or information transfer from the network end to the customer gateway. In one aspect, the switches may periodically retrieve the measurement data from the customer gateway and provide the same to network servers, such as servers 138, which have associated database 140 and computer programs 139. In another aspect, the DSL modems may send the measurements to their associated switches. In another aspect, the servers may query the switches for the measurements made at the customer gateways. For the purpose of this disclosure, line measurements may be made on the lines by any method and made available for use in the present system.

Still referring to FIG. 1, the system 100 further is shown to include a line management system 128 that includes one or more servers, such server 130, database 134 and computer programs 132 stored or embedded in computer-readable media accessible to the server 130. The database 134 and/or database 140 may store information relating to each customer. Such information may include: identity of the customer, such as identifiers associated with the customers, which may include a telephone number associated with the line, serial number of the customer gateway, internet protocol address, etc.; loop length of the line; service provided to the customer, including upstream and downstream data transfer rates subscribed by the customer; historical measured values of any of the parameters relating to the lines; wire gauge; loop length of the line; etc. The functions of the Line Management System 128 are described in detail later.

The system also includes a provisioning system 136, which, in one aspect, may provide planning tools, such as map coordinates and bandwidth requirements for potential customers who have not yet subscribed to xDSL services. As homes and office buildings are built, for example, potential customers may be added to the provisioning system 136 even though the potential customers have not yet subscribed to any xDSL services. The potential customers may be assigned to potential neighborhoods, and the provisioning system 136 may be implemented such that potential Servicing Area Interfaces may be planned for neighborhoods. The provisioning system 136, in another aspect, may be updated to include new customers and may further be updated as customers terminate services. The provisioning system 136 may also be updated as customers change service. For example, if customer N is a business customer who has grown such that the current "3 MB" service is no longer adequate, and who has requested "6 Meg" service, then a request from the business customer N seeking additional bandwidth may be entered into the provisioning system 136 before the backbone 126 and the DSL line N 114 are upgraded.

As noted above, the backbone 126 also includes other servers 138, such as content servers, other databases 140, such as content databases, and other programs 139, such as associated computer programs 142. The backbone also connects to the Internet and various other content providers (not shown). The content servers may provide services such as Video on Demand (VoD), Voice over Internet Protocol (VoIP), Internet services, and network application services, while the other databases 140 may contain content such as movies, video games, and other content. The network 126 is shown coupled to call centers 141, maintenance centers or facilities 142 and Installation and Repair Centers 144 of the service provider. Such centers may be accessible to the Line Management System 128 directly or via the Internet.

Figure 2:
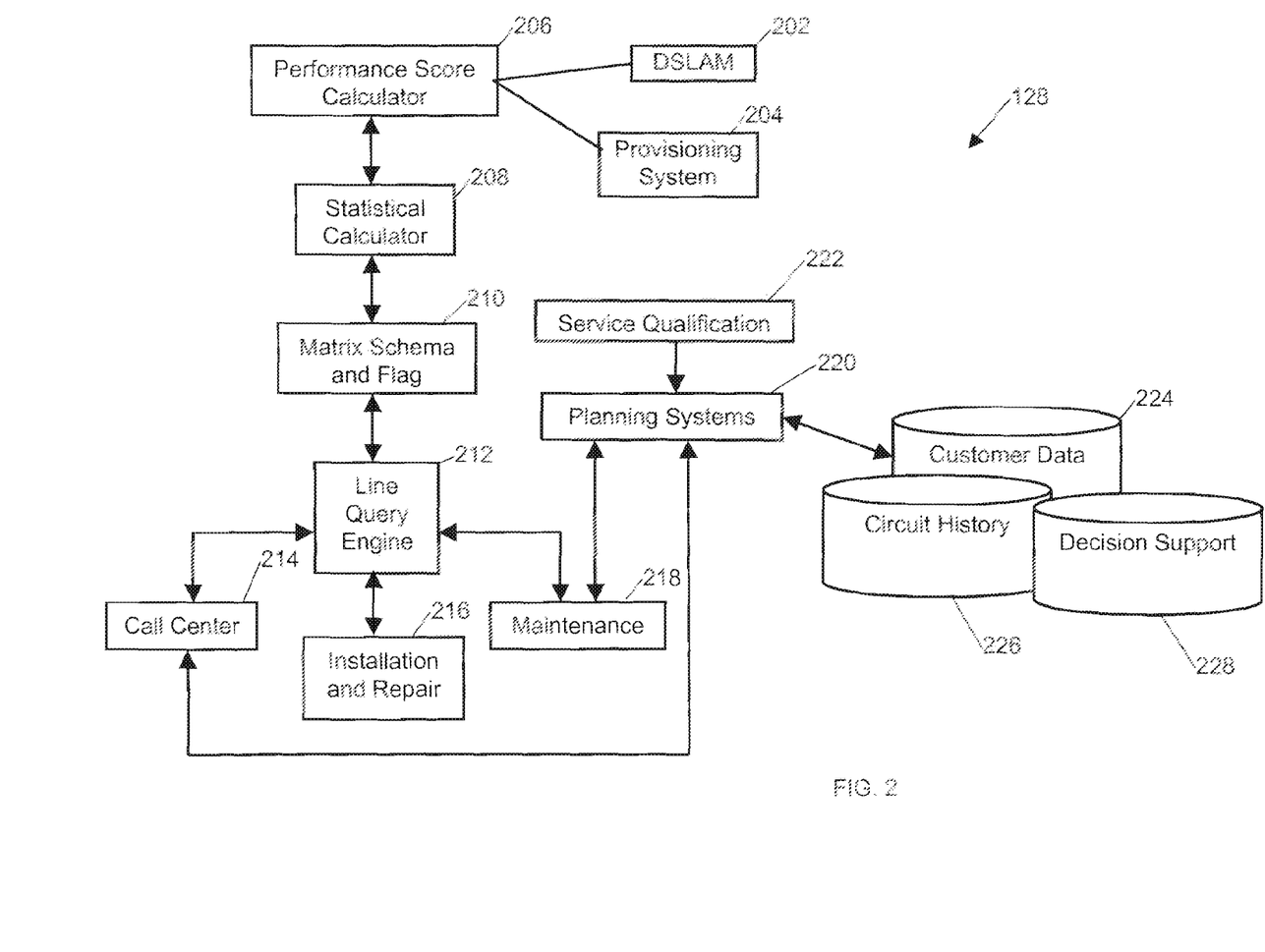
FIG. 2 is a functional diagram depicting aspects of the exemplary line management system depicted in FIG. 1.

FIG. 2 shows an exemplary schematic diagram depicting the line management system 128 of FIG. 1 in greater detail. The server of the line management system exchanges data with a DSLAM 202, which may be (for example) any of the switches 118, 120, or 122 of FIG. 1, and with a provisioning system 204, which may be the provisioning system 136 of FIG. 1. As noted earlier, in one aspect, the DSLAM 202 may collect line performance data for the customer gateways and send the collected information to one or more network servers for storage, such as in a database 226. Other line performance measurements and data may be provided to the line management system directly or via the servers 138.

The data received by the line management system 128 may be written into a matrix schema, residing within a matrix schema and flag 210. The matrix schema may include any number of performance measurements with respect to the lines. For example, the matrix schema may include measurements of available bandwidth, actual upstream and downstream bit rates, downstream noise margin such as bit rates, downstream attenuation, upstream attenuation, difference between downstream and upstream attenuation, count of errors, count of code violations, downstream and upstream aggregate power, etc.

The line management system 128 also includes a statistical calculator 208 that provides statistical analysis relating to line performance. For the purpose of this disclosure the statistical calculator may include any suitable programs, algorithms, formulas to make any suitable performance computation for each line, groups of lines, neighborhood cities, states or the network. For example, the statistical calculator 208 may determine averages, such as an average downstream maximum attainable bit rate (i.e., an average of the downstream maximum attainable bit rates measured for each customer in a particular neighborhood), a neighborhood average of downstream noise margin (i.e., an average of the downstream noise margins measured for each customer in a particular neighborhood), and other averages with respect to each parameter measured in each neighborhood. In another aspect, the statistical calculator may determine a weighted average of selected parameters based on current values of such parameters and also the historical values for each line and/or groups of lines, as described in more detail with respect to FIG. 3. In one aspect of the disclosure, any column or any row, or any representation of the data within the matrix schema, may be regarded as a vector. For example, a historical representation of the measurements of a particular customer's DSL line, taken over a number of dates, may be regarded as a vector. Also, any average or other statistical calculation made on the data may be regarded as an adaptive benchmark, since the average may change or "adapt" to include new data.

The statistical calculator 208 may also make other statistical calculations. For example, the statistical calculator 208 may determine an average over time as well as an average among customers within a neighborhood. The statistical calculator 208 also makes multivariate statistical calculations, including determining first-order and second-order statistics for different line performance parameters, different customers, and different times for each neighborhood.

Additionally, the statistical calculator 208 may also interpolate and extrapolate data for each customer and for each neighborhood. For example, if a particular measurement was not made at a scheduled time, an estimate of the particular measurement may be made by interpolating or extrapolating from other data. Extrapolating may be particularly useful for neighborhoods and for customers that do not yet have service, such as neighborhoods and customers identified by the provisioning system 204. Accordingly, the statistical calculator 208 may be used to predict how alteration and modification of the network may impact performance for both existing and potential customers. Additionally, the statistical calculator 208 may also determine statistics for the network as a whole. Average performance for all DSL lines, or for all DSL lines of a particular loop length, may be calculated, for each measurement parameter.

Still referring to FIG. 2, the line management system 128 also includes a performance score calculator 206. The performance score calculator 206 may assign a score to each measurement and to each calculated value in the matrix schema, and may then scale the score into a selected range such as a range from 0 to 100. For example, a measured downstream maximum bit rate for a customer may receive a score of 65 with respect to the neighborhood in which the customer is located, and a score of 88 with respect to all neighborhoods having a similar DSL loop length. Similarly, the neighborhood in which the customer is located may receive a score of 70 with respect to all neighborhoods of similar DSL loop length. The customer receiving a score of 65 may have slightly better performance than a neighborhood average, and the neighborhood receiving a score of 70 may have slightly better performance than other neighborhoods in the network. Accordingly, no repairs may be necessary.

The statistical calculator 208 may also create a flag within the matrix schema 210. The flag may be based on a comparison of performance metric with a selected benchmark, wherein the benchmark may be based on a single line or multiple lines and may be based on a single or multiple parameters. The flag may be "red," indicating a severe problem requiring repair; "yellow," indicating a significant problem that may develop into a severe problem; or "green," indicating a slight problem or no problem. Other flags, including colors, graphical representations, effects such as flashing, tones and other sounds, and text reports may be provided. Different problems may be represented by different flags, e.g. by different visual and audible indicators.

In a network, such as network 100, there may be many types of impairments. For example, a Service Access Interface Cross-Box (SAI X-Box) impairment and/or a Distribution Plant (F2 cable) impairment may potentially impact multiple xDSL subscribers served on the same cable. As an example, this population may be distributed over a 5 kft range and impact could vary significantly across the population. On the other hand, a Serving Terminal and Drop Wire (STDW) impairment may impact either a single living unit or a cluster of neighboring living units. Such a population is generally distributed in a less than 2 kft range and impairment characteristics may be less variable across the population. A Single Living Unit (SLU) impairment may affect a single living unit, and impact is limited to that living unit.

Using any of the described embodiments of the present disclosure, diagnosis of trouble on the line may be initiated proactively or reactively. Proactive diagnosis may be used to locate and identify problems that have not yet been reported, while reactive diagnosis may be used to locate and identify a root cause for a problem, or for several problems, that have been reported.

In one aspect, the system of the present disclosure provides a proactive diagnosis method that is superior to scalar diagnosis methods that look at the current reported performance values but that are not correlated to any historical or neighborhood benchmark. The system of the described embodiment of the present disclosure facilitates trouble isolation and trouble restoration objectively, rather than relying on subjective determination of the tester. The systems uses a single line information and group information to determine benchmarks that are utilized to flag a line and/or a group of lines having a related problem. Accordingly, a common noise source may more easily be found using the system of the described embodiment of the present disclosure. The cost of diagnosing problems may also be reduced, since neighborhood problems may be identified after a few lines are studied, obviating need to examine other lines in the neighborhood.

In another aspect, performance degradation is flagged, audited against the benchmark and trouble is isolated by cause. Such a course of action may be much clearer and more efficient with this knowledge, providing an objective, rigorous and auditable framework for each line to operate at or above its benchmark. Trouble identification, isolation and repairs are further automated, and may be implemented across a wider geographic scope, reducing repair costs. Both real time (reactive) and batch (proactive) analysis and assessment of lines is thus facilitated.

In one aspect of the disclosure, any column or any row, or any representation of the data within the matrix schema, may be regarded as a vector. For example, a historical representation of the measurements of a particular customer's DSL line, taken over a number of dates, may be regarded as a vector. Also, any average or other statistical calculation made on the data may be regarded as an adaptive benchmark, since the average may change or "adapt" to include new data. Accordingly, each line may have an objective benchmark established and each line or any group og lines may be examined on a vectored basis across any number of suitable benchmarks, including benchmarks based on its own history, neighborhood history, network-wide data, theoretical data, etc. All lines violating the benchmark can thus be proactively identified when they fall below one or more benchmarks, and a cause of each impairment may be determined allowing prompt trouble isolation. Also, impairments affecting any group of lines, including entire neighborhoods may be identified as neighborhood impairments, rather than as line impairments affecting large numbers of lines, and may therefore be resolved at the neighborhood level.

Still referring to FIG. 2, the line management system 128 is further shown to include a line query engine 212 that may receive a query from a call center 214, an installation and repair department 216, and/or a maintenance department 218. The line query engine 212 may issue a query to the matrix schema and flag 210. For example, if a customer calls the call center 214 to inquire on the status of a DSL line assigned to the customer, a help desk employee may issue a query to the line query engine 212 and have the DSL line tested. Performance data may be presented on a web browser accessible to the help desk employee, who may relay the information to the customer over the telephone. Similarly, an Installation and Repair technician 216 may query the line query engine 212 to determine the status of a repair order (i.e., a trouble ticket), and an employee of the maintenance department 218 may check on the status of any DSL line or neighborhood in the network. Also, the system 128 proactively provides the status of the lines in the form of reports to user's GUIs at the call centers 214, installation and repair centers 216 and maintenance centers 218.

The line query engine 212 is also accessible to planning systems 220. For example, a planning system may query the line query engine 212 to determine how the performance of a neighborhood would be impacted if a newly built building were connected via an existing SAI. The planning systems 220 may simulate different network configurations and test each simulation to determine a preferred network configuration. A cost of each different network configuration may be obtained from a service qualification 222 unit.

Thus, the planning systems 220 is useful when a new geographical region is to become connected to the network. If a new neighborhood is built, e.g. in a rural area, many different network configurations may be contemplated. Wireless connection within one head end, wireless connection with multiple head ends, DSL connection via a single SAI, and other network configurations may all be contemplated, each with an associated cost. The planning systems 220 may determine a performance score (by querying the line query engine 212) for the neighborhood in each contemplated network configuration, and may help determine a preferred network configuration.

As shown in FIG. 2, several data repositories or databases may be used. For example, a customer data repository 224 may contain customer data, as described earlier with respect to FIG. 1. The customer data repository 224 may also include an identifier for each gateway and for each modem at the customer's location. If a customer moves, purchases new equipment, or requests a change in service, then the customer data repository 224 may be updated. A circuit history repository 226 may include a history of physical changes made to the network infrastructure corresponding to the customer. The circuit history repository 226 may include a DSL line length, location, port identifier, DSLAM identifier, and other similar data. A decision support repository 228 may contain historical data for the customer, such as patterns of use of each service. Collectively, the customer data repository 224, the circuit history repository 226, and decision support repository 228 contain the data necessary to reproduce the matrix schema, and may be implemented as a memory, flash memory, magnetic disk, or any other medium capable of storing data.

Figure 3:
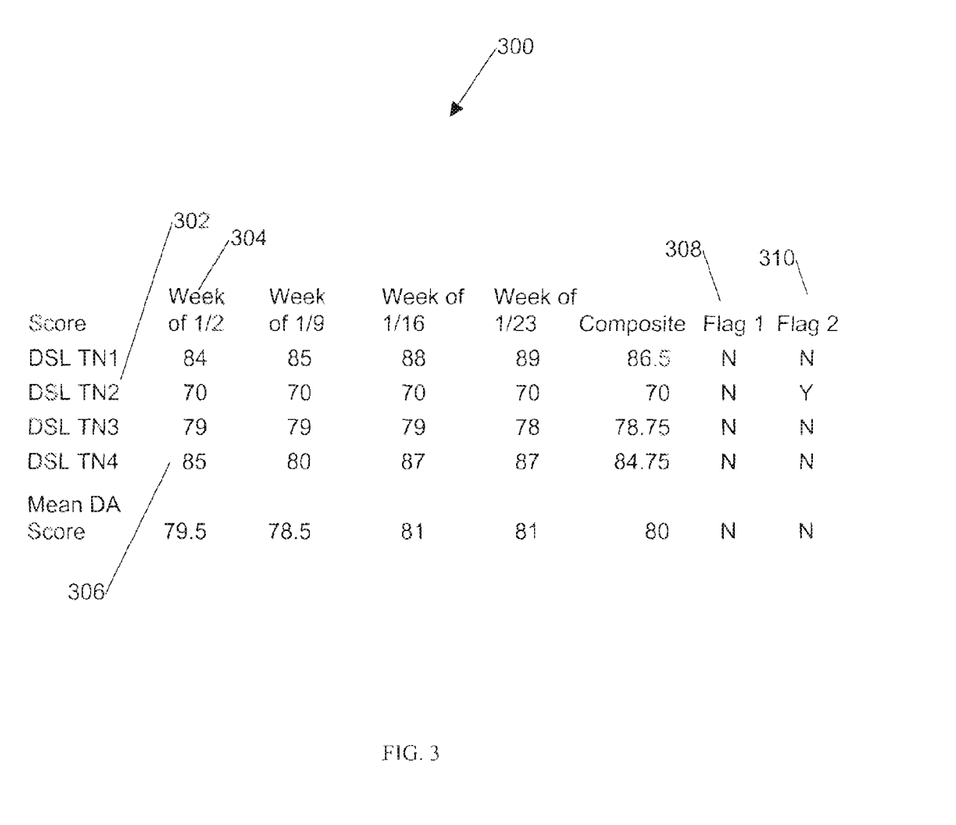
FIG. 3 is a table showing an example of a schema, in accordance with an embodiment of the present disclosure.

FIG. 3 is a table 300 showing an example of a schema, in accordance with an embodiment of the present disclosure. The table 300 shows an exemplary base matrix defined for a group of lines (which may be a neighborhood). Each row 302 corresponds to a specific DSL line, while each column 304 corresponds to a time point. Each cell in the matrix 300 is populated with a composite or weighted average value of a selected number of performance parameters relating to the lines. In the example shown, the composite or the weighted average value may be between 0 and 100. The table 300 also is shown to include columns for a pair of flags 308 and 310. The weighted average may correspond to any number of selected parameters, which may include, bit rates, maximum attainable rates, noise margin ratio, attenuation, bit/tone distribution, error seconds, code violation, modem retainers, etc. In the matrix 300, line DSL TN2 is shown to have a weighted average for a four week period of 70 while the weighted average of line DSL TN1 for the same time period is 86.5. The overall weighted average for all of the lines in the group is 80. Flag 2 is indicated by a selected benchmark which may indicate that a group weighted average composite score is below the groups average by an excessive amount.

Figure 4:
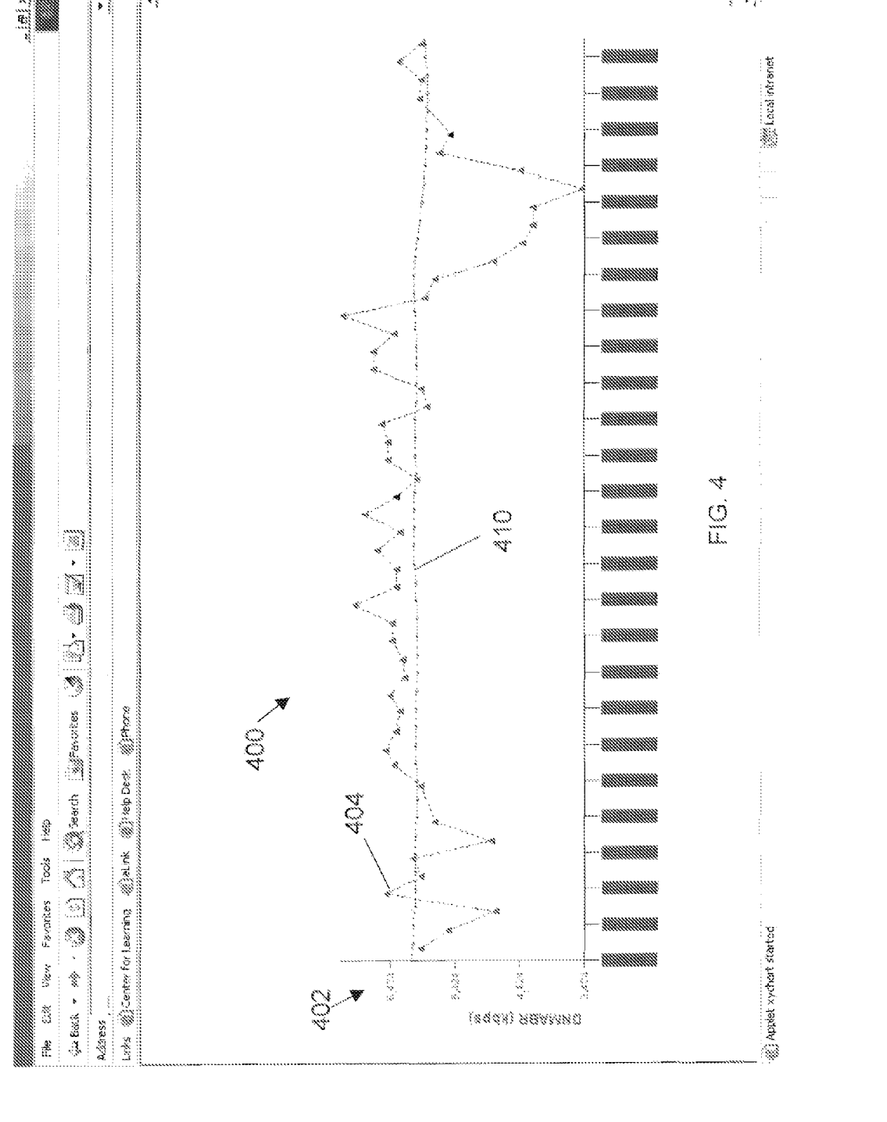
FIG. 4 is a timing diagram showing a running average of measurements of an exemplary parameter relating to a line.

FIG. 4 is a diagrammatic representation of a timing diagram 400 showing the data 402 for a parameter relating to the lines, such as a received noise margin in kilobits per seconds, that may be stored in a database, and that may used to establish a benchmark, in accordance with an embodiment of the present disclosure. The noise margin may be recorded at each of several time points 404, such as once per week, and stored in a database. The several time points may have a frequency or period that is adjustable, such that the noise margin may be recorded daily, weekly, twice each week, monthly, or any other frequency or period that may be desired.

FIG. 4 also shows a running average 410 obtained by a statistical calculator, such as the statistical calculator 208 of FIG. 2. A running average of any parameter may be made for any related time period. For example, an average of all noise margins may be calculated using measurements that were recorded during the most recent 4 weeks, 26 weeks, 52 weeks, etc.

The measurements and the averages may be made for each individual user, or for each neighborhood, or for the network as a whole. Comparisons may be made between various measurements, or between various averages, or between measurements and averages. For example, a user may have a noise margin that exceeds a 52-week average for the user by more than a desired percentage, or the user may have a noise margin that exceeds a contemporaneously measured neighborhood noise margin by more than a desired percentage, or the user may have a noise margin that exceeds a 52-week neighborhood noise margin average by more than a desired percentage. Flags may be set in response to such variations. Reports may be generated to alert technicians that repairs may be necessary. The flags themselves may be recorded in the database, to allow the technicians to see that a particular user may have a particularly problematic line. Repairs and maintenance may be ordered in response to the reports.

Figure 5:
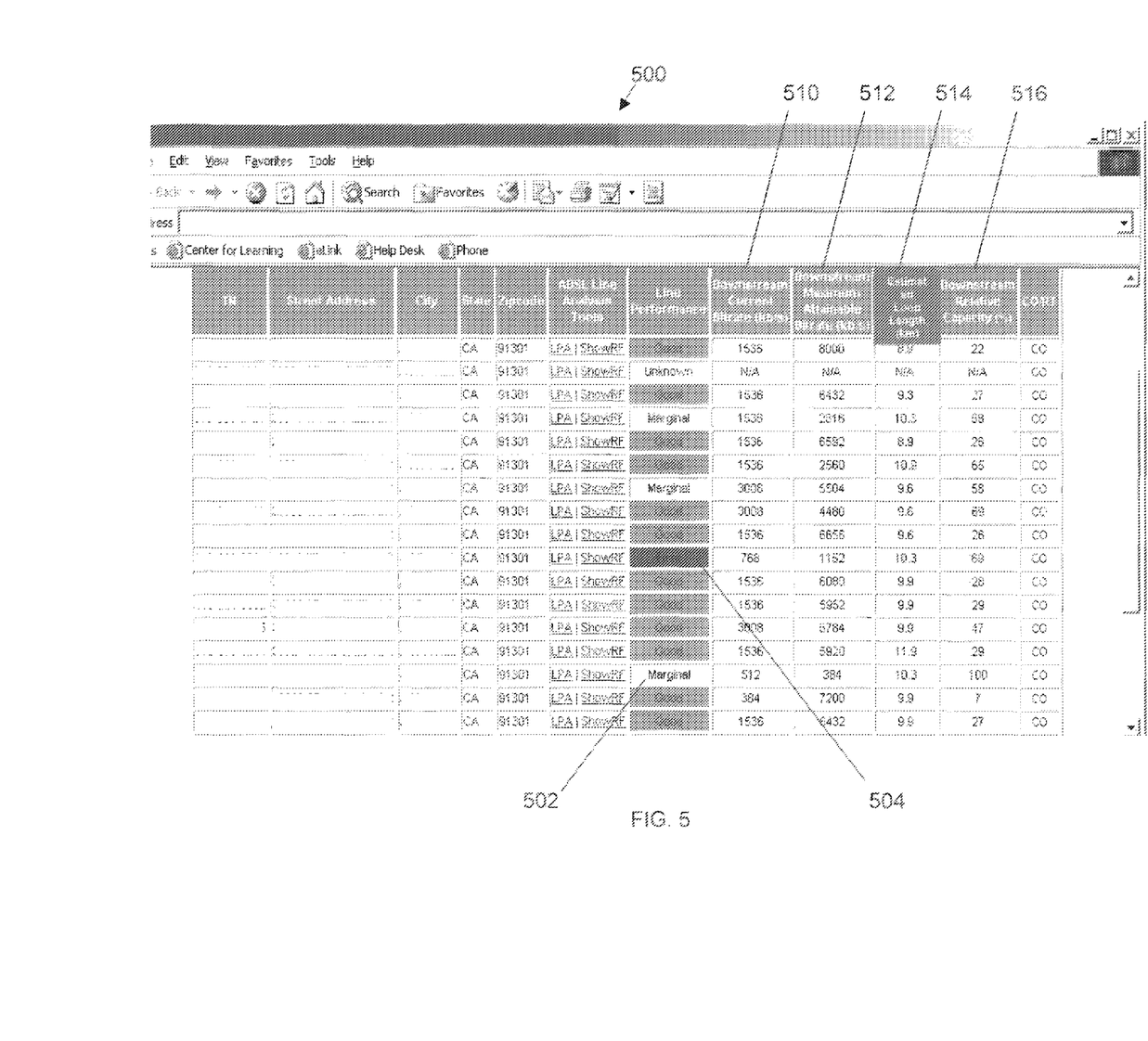
FIG. 5 is a representation of an exemplary report that may be generated showing certain measured parameter values and condition of lines for a set of customers.

FIG. 5 is a representation of an exemplary report 500 that may be generated by the Line Management System 128 (FIG. 1) in accordance with an embodiment of the present disclosure. The report 500 identifies impaired lines, such as line 504 and marginal lines, such as line 502, based on the comparison with a benchmark. The report 500 also provides parameter values of the various lines, such as current downstream bit rate 510, downstream maximum available bit rate 512, to estimated loop length 514, downstream relative capacity 516, etc. The report 500 (and other reports) may be provided to call centers 141, maintenance personnel 142, installation and repair personnel 144 for display and use. The report may also indicate whether the impairment is only for an individual line basis or across all the neighborhood lines. The report may be used to diagnose and repair the telecommunications network by pinpointing the symptoms and cause possibilities along with the area of impact.

Figure 6:
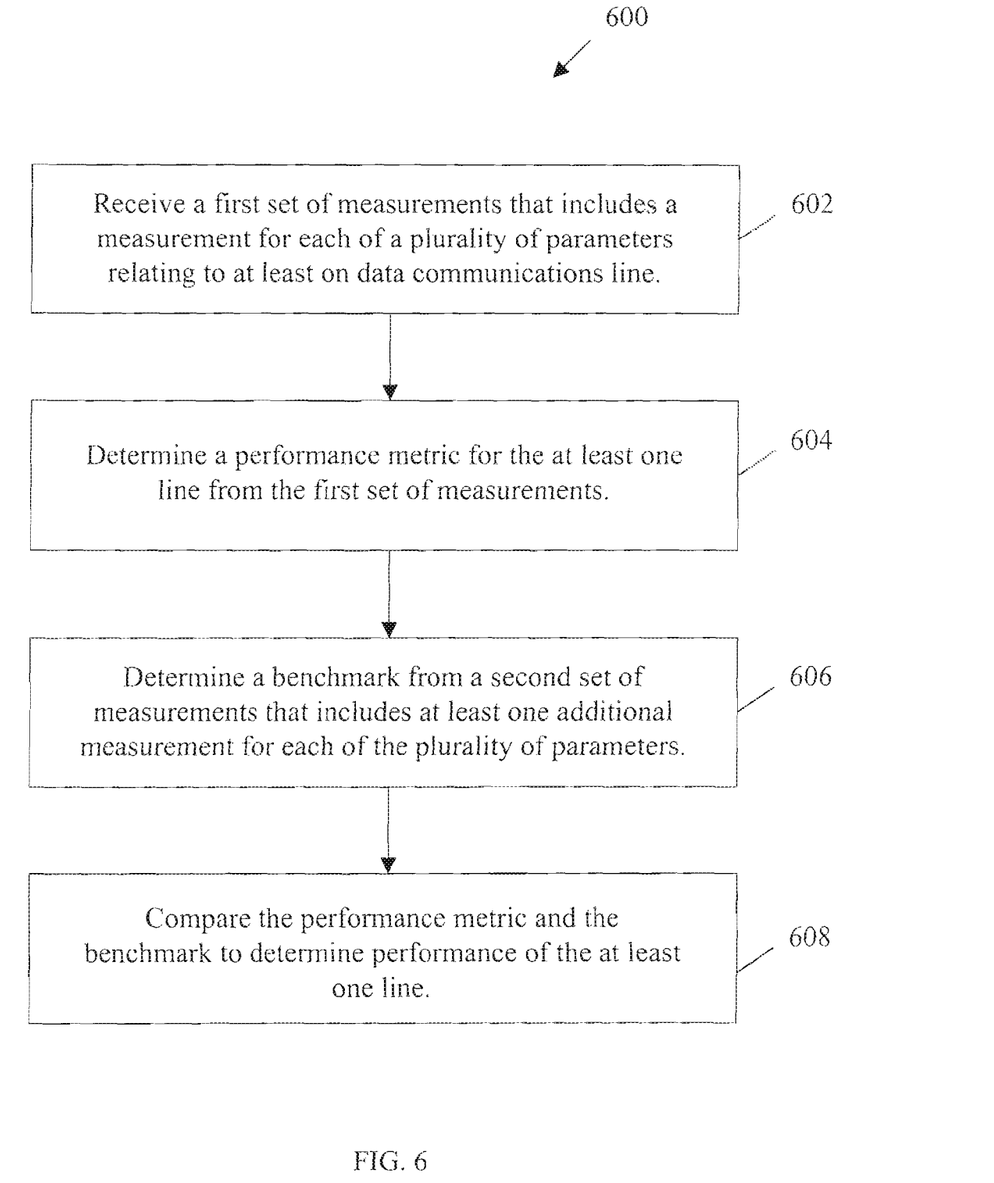
FIG. 6 is a flowchart depicting a method for determining performance of telecommunications lines with respect to an adaptive benchmark, in accordance with one embodiment of the present disclosure.

FIG. 6 shows a flow chart depicting an exemplary method 600 according to the disclosure. A first set of measurements relating to a plurality of parameters for at least one line are received (block 602). Using these measured values, which may be the current values, a performance metric for the at least one line is determined (block 604). The performance metric may be any one of the metrics described earlier, including a weighted average of the parameters. The at least one line may be a group of lines, such as a neighborhood. As shown in block 606, a benchmark is established from a second set of measurements that includes at least one additional measurement for each of the plurality of parameters as compared to the data used to determine the performance metric. The second set may include historical data for the at least one line and/or data relating to other lines, such as lines in the same neighborhood wire, center, etc. The performance metric is compared with the benchmark to determine the performance of the at least one line (block 608). Thus, a performance metric of a line or group of lines may be compared with any benchmark to determine performance of one line or a group of lines. The method further may include updating the benchmark periodically, which may be based on historical values and/or data relating to additional lines.

Figure 7:
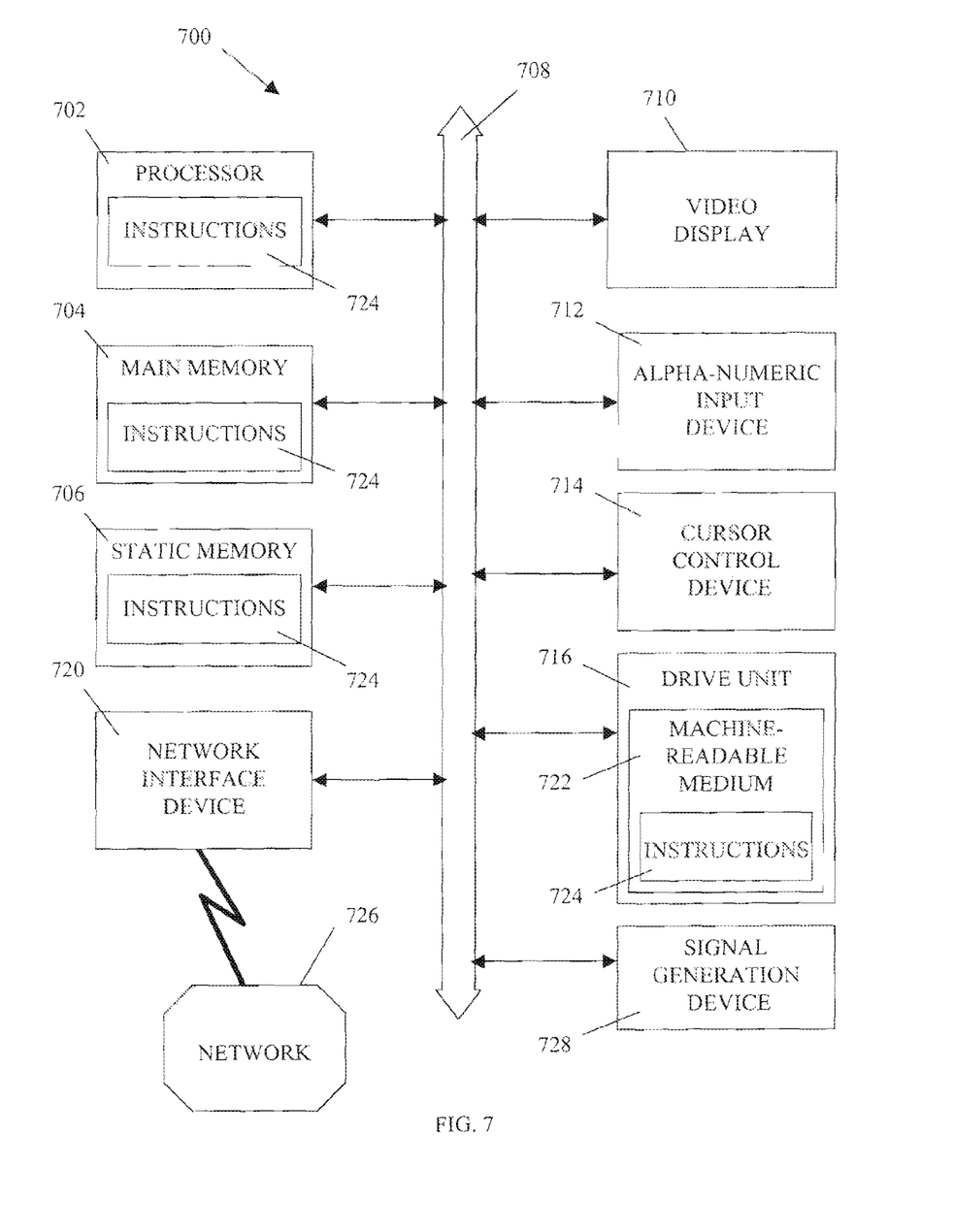
FIG. 7 is a diagrammatic representation of a machine in the form of a computer system within which a set of instructions, when executed, may cause the machine to perform any one or more of the methodologies discussed herein.

FIG. 7 is a diagrammatic representation of a machine in the form of a computer system 700 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a set-top box (STB), a personal digital assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 728 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated herein above. The instructions 724 may also reside, completely or at least partially, within the main memory 704, the static memory 706, and/or within the processor 702 during execution thereof by the computer system 700. The main memory 704 and the processor 702 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-readable medium accessible to a processor for executing instructions contained in a computer program embedded in the computer readable medium, the computer program comprising:

an instruction to receive a first set of measurements that includes a measurement relating to each of a plurality of parameters relating to at least one data communication line in a telecommunication network;

an instruction to determine a performance metric relating to the at least one line from the first set of measurements;

an instruction to determine a benchmark from a second set of measurements, wherein the second set of measurements includes measurements for a group of lines in the telecommunication network, wherein the group of lines corresponds to at least one of: lines having substantially same loop length, lines connected to a common wire center, a city, or a state;

an instruction to compare the performance metric with the benchmark to infer performance of the at least one line; and an instruction to store a result of the comparison on a suitable medium.

2. The computer-readable medium of claim 1, wherein the at least one line is a Digital Subscriber Line and the performance metric and the benchmark each is based on a statistical computation utilizing the plurality of parameters.

3. The computer readable medium of claim 2, wherein the group of lines comprises a group of Digital Subscriber Lines.

4. The computer readable medium of claim 3, wherein the performance metric and the benchmark each corresponds to one of a single line and a group of lines.

5. The computer readable medium of claim 1, wherein the computer program further comprises an instruction to update the benchmark based on historical values.

6. The computer readable medium of claim 1, wherein the performance metric and the benchmark each is a weighted average of the measurements of the plurality of parameters.

7. The computer readable medium of claim 1, wherein the plurality of parameters are selected from a group consisting of: upstream bit rate; downstream bit rate; difference between downstream bit rate and upstream bit rate; maximum attainable bit rate; downstream attenuation; upstream attenuation; difference between downstream attenuation and an upstream attenuation; downstream aggregate power; upstream aggregate power; and code violation.

8. The computer readable medium of claim 1, wherein the computer program further comprises instructions to send a report to a user display that includes an indication of a problem with the at least one line when the difference in the benchmark and the performance metric is greater than a selected value.

9. The computer readable medium of claim 1, wherein the computer program further comprises an instruction to periodically update the benchmark based at least in part on historical values of the plurality of parameters.

10. The computer readable medium of claim 1, wherein the at least one data communication line is a telecommunication line.

11. A method for determining performance of lines of a telecommunications network, comprising:

receiving a first set of measurements that includes a measurement relating to each of a plurality of parameters for at least one of said lines;

determining a performance metric from the received measurements for the at least one line;

determining a benchmark from a second set of measurements, wherein the second set of measurements includes measurements for a group of lines, wherein the group of lines corresponds to one of: lines having substantially same loop length, lines connected to a common wire center, a city, or a state;

comparing the performance metric with the benchmark to determine performance of the at least one line; and storing a result of the comparison on a suitable medium.

12. The method of claim 11, wherein the second set of measurements includes measurements for each of the parameters for a selected group of lines, each such line being adapted to provide content over the telecommunications network.

13. The method of claim 11, wherein the first set of measurements corresponds to a first group of lines and the second set of measurements corresponds to a second group of lines.

14. The method of claim 11, wherein the lines are digital subscriber lines and wherein the plurality of parameters are selected from a group consisting of: upstream bit rate; downstream bit rate; difference between downstream bit rate and upstream bit rate; maximum attainable bit rate; downstream attenuation; upstream attenuation; difference between downstream attenuation and an upstream attenuation; downstream aggregate power; upstream aggregate power; and code violation.

15. The method of claim 11, wherein the second set of measurements includes historical measurements relating to at least one of the parameters in the plurality of parameters.

16. The method of claim 11 further comprising updating the benchmark based at least in part on historical average of at least one of the parameters in the plurality of parameters.

17. A method of inferring performance of lines of a telecommunications network, comprising:
  determining a first weighted average from a first set of measurements for a plurality of parameters relating to a first group of lines, each line in the first group of lines adapted to provide content over the telecommunications network; and
  determining a second weighted average from a second set of measurements that includes measurements for each of the plurality of parameters for a second group of lines, wherein the second group of lines corresponds to at least one of: lines having substantially same loop length, lines connected to a common wire center, a city, or a state; and
  comparing the first weighted average with the second weighted average to infer a level of performance for the first and second groups of lines.

18. A system for determining performance of lines of a telecommunications network, comprising:
  a database that stores measurements of a plurality of parameters for a first plurality of data communications lines;
  a processor having access to the database and a computer program, the processor utilizing the database to execute instructions contained in the computer program, the computer program comprising:
    an instruction to determine a performance metric of at least one line from a first set of measurements;
    an instruction to determine a benchmark from a second set of measurements, wherein the second set of measurements includes measurements for a group of lines, wherein the group of lines corresponds to at least one of: lines having substantially same loop length, lines connected to a common wire center, a city, or a state;
    an instruction to compare the performance metric with the benchmark to infer performance of the at least one line; and
    an instruction to store a result of the comparison on a suitable medium.

19. The system of claim 18, wherein the second set of measurements further includes measurements for each of the parameters corresponding to a plurality of distinct time periods.

20. The system of claim 19, wherein the first and second sets of measurements each include measurements for a separate group of lines.

21. The system of claim 18, wherein the computer program further comprises an instruction to update the benchmark based on a running average over a selected time period.

22. The system of claim 18, wherein the performance metric and the benchmark each is based on a statistical computation.

23. The system of claim 18, wherein the plurality of parameters are selected from a group consisting of: upstream bit rate; downstream bit rate; difference between downstream bit rate and upstream bit rate; maximum attainable bit rate; downstream attenuation; upstream attenuation; difference between downstream attenuation and an upstream attenuation; downstream aggregate power; upstream aggregate power; and code violation.

24. The system of claim 18, wherein the second set of measurements includes historical measurements relating to at least one of the parameters in the plurality of parameters.

25. The system of claim 18, wherein the computer further comprises instructions to update the benchmark based at least in part on historical average of at least one of the parameters in the plurality of parameters.

26. The system of claim 18, wherein the computer program further comprises an instruction to send a message relating to the performance of the at least one line based on the comparison of the performance metric and the benchmark.

27. The system of claim 18, wherein the at least one data communication line is a telecommunication line.

* * * * *